No. 612,290. Patented Oct. 11, 1898.
J. WERNTZ.
HORSESHOE.
(Application filed Dec. 22, 1897.)
(No Model.)

Witnesses
F. L. Ourand.
Jos. L. Coombs.

Inventor:
Jacob Werntz,
Louis Bagger & Co.
Attorneys.

United States Patent Office.

JACOB WERNTZ, OF AKRON, OHIO, ASSIGNOR TO MEAD M. WERNTZ, OF SAME PLACE.

HORSESHOE.

SPECIFICATION forming part of Letters Patent No. 612,290, dated October 11, 1898.

Application filed December 22, 1897. Serial No. 663,020. (No model.)

*To all whom it may concern:*

Be it known that I, JACOB WERNTZ, a citizen of the United States, and a resident of Akron, in the county of Summit and State of Ohio, have invented certain new and useful Improvements in Horseshoes; and I do hereby declare that the following is a full, clear, and exact description of the invention, which will enable others skilled in the art to which it appertains to make and use the same, reference being had to the accompanying drawings, which form a part of this specification.

My invention relates to horseshoes; and its object is to provide an improved construction of the same which will effectually prevent slipping of the animal and will also tend to prevent the hoof from splitting, breaking, or being otherwise injured.

The invention consists, essentially, in a horseshoe formed with an integral downwardly-extending continuous calk extending from end to end of the shoe and also formed with an upwardly-extending integral sharp thin flange adapted to engage with the lower end of the hoof, as hereinafter fully described and claimed.

Figure 1:
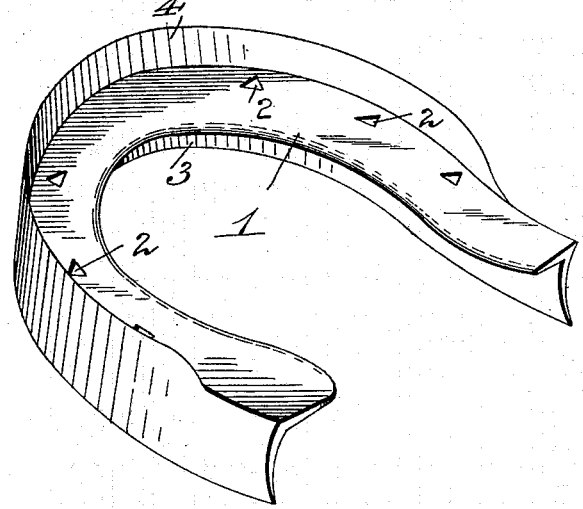
Figure 2:
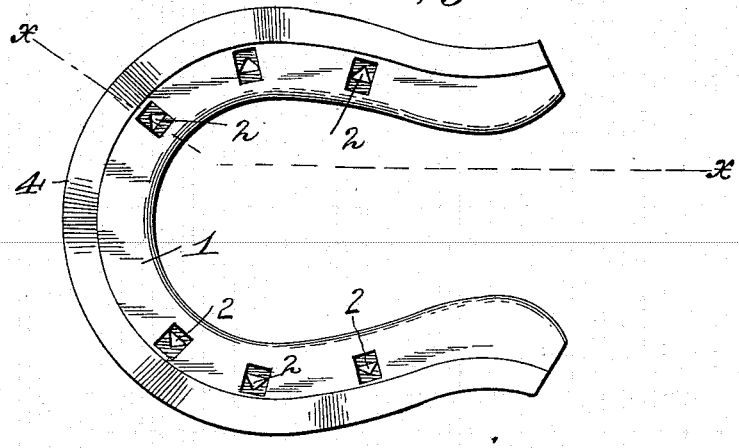
Figure 3:
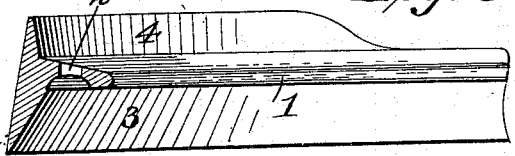

In the accompanying drawings, Figure 1 is a perspective view of a horseshoe constructed in accordance with my invention. Fig. 2 is a bottom view of the same. Fig. 3 is a central longitudinal sectional view on the line $x$ $x$ of Fig. 2.

In the said drawings the reference-numeral 1 designates the shoe proper, formed with triangular holes 2 for the passage of the correspondingly-formed nails, by which the shoe is secured to the hoof. These holes are formed with countersunk seats for the nails, so that when the latter are driven in the heads will set crosswise in the shoe. By this construction the usual creases in the shoe for the nail-heads will be obviated, as each nail-head will have its separate seat.

Upon the lower side of the shoe, at the outer edge, there is formed a downwardly-extending continuous calk 3, extending from end to end of the shoe. This calk is beveled, as seen, so that the lower or tread end is sharpened.

Upon the upper side the shoe is formed with an upwardly-extending integral flange 4, which is adapted to engage with the lower end of the hoof of a horse and extend around the same.

Any method of making the shoe found convenient or desirable may be employed; but I prefer to make them from T metal bars cut into the proper lengths and then bent into shape and pressed to form the three-cornered nail-hole and separate nail-head seats.

Having thus fully described my invention, what I claim is—

As an improved article, a horseshoe having formed integral therewith a downwardly-extending continuous calk having a beveled edge, and an upwardly-extending flange formed integral with and extending nearly the entire length of the shoe, and the upper or inner face of the shoe beveled inwardly from said flange, substantially as described.

In testimony that I claim the foregoing as my own I have hereunto affixed my signature in presence of two witnesses.

JACOB WERNTZ.

Witnesses:
H. M. HAGELBARGER,
WM. E. SHEPARD.